(12) United States Patent
Lian et al.

(10) Patent No.: US 12,083,702 B2
(45) Date of Patent: Sep. 10, 2024

(54) BAMBOO STRAW MACHINING METHOD

(71) Applicant: Long Bamboo Technology Group Co., Ltd., Fujian (CN)

(72) Inventors: Jianchang Lian, Fujian (CN); Lei Feng, Fujian (CN)

(73) Assignee: Long Bamboo Technology Group Co., Ltd., Nanping (CN)

( * ) Notice: Subject to any disclaimer, the term of this patent is extended or adjusted under 35 U.S.C. 154(b) by 368 days.

(21) Appl. No.: 17/612,584

(22) PCT Filed: Feb. 20, 2021

(86) PCT No.: PCT/CN2021/076968
§ 371 (c)(1),
(2) Date: Nov. 19, 2021

(87) PCT Pub. No.: WO2022/126853
PCT Pub. Date: Jun. 23, 2022

(65) Prior Publication Data
US 2022/0396001 A1    Dec. 15, 2022

(30) Foreign Application Priority Data

Dec. 17, 2020    (CN) .......................... 202011495394.4

(51) Int. Cl.
*B27J 1/00*    (2006.01)
*A47G 21/18*    (2006.01)
*B27H 1/00*    (2006.01)
*B27H 5/00*    (2006.01)
*B27M 1/08*    (2006.01)
(Continued)

(52) U.S. Cl.
CPC ...................... *B27J 1/00* (2013.01)

(58) Field of Classification Search
CPC ............... B27J 7/00; B27J 1/00; A47G 21/18
See application file for complete search history.

(56) References Cited

FOREIGN PATENT DOCUMENTS

| CN | 101532592 A | 9/2009 |
|----|-------------|--------|
| CN | 101947803 A | 1/2011 |

(Continued)

OTHER PUBLICATIONS

English translate (WO2020059635A1), retrieved date Jan. 3, 2024.*

(Continued)

*Primary Examiner* — Mohammed S. Alawadi

(57) ABSTRACT

The invention relates to the technical field of bamboo products machining, in particular to a bamboo straw machining method, comprising: connecting two or more bamboo pieces to form a bamboo strip, continuously winding the bamboo strip according to a preset helical angle to form a cylinder, and cutting the cylinder according to a preset interval to form straws. Compared with traditional methods, the method has the following advantages: bamboo pieces are continuously connected to obtain a bamboo strip for continuous production, then the continuous bamboo strip is continuously wound to obtain a cylinder which is good in mechanical property, stable in structure and uniform in appearance, and finally, the cylinder is cut at equal intervals to continuously produce bamboo straws that are highly consistent in specification and performance; and the working efficiency is improved by over 20% on the whole. Labor and equipment costs are greatly reduced.

8 Claims, 5 Drawing Sheets

(51) Int. Cl.
*B27M 3/24* (2006.01)
*B29D 23/00* (2006.01)
*B31C 3/00* (2006.01)

(56) References Cited

FOREIGN PATENT DOCUMENTS

| | | | | | |
|---|---|---|---|---|---|
| CN | 105650363 | A | | 6/2016 | |
| CN | 209152984 | U | | 7/2019 | |
| CN | 110126050 | A | * | 8/2019 | ............. B27M 3/24 |
| CN | 110714363 | A | * | 1/2020 | ............. A47G 21/18 |
| CN | 210227707 | U | | 4/2020 | |
| CN | 210930728 | U | | 7/2020 | |
| JP | 2020081669 | A | * | 6/2020 | ........... A47G 21/186 |
| WO | WO-2020059635 | A1 | * | 3/2020 | |
| WO | 2020217256 | A1 | | 10/2020 | |

OTHER PUBLICATIONS

English translate (JP2020081669A), retrieved date Jan. 3, 2024.*
English translate (CN110126050A), retrieved date Jan. 3, 2024.*
English translate (CN110714363A), retrieved date Jan. 4, 2024.*

* cited by examiner

BAMBOO STRAW MACHINING METHOD

TECHNICAL FIELD

The invention relates to the technical field of machining of bamboo products, in particular to a bamboo straw machining method.

DESCRIPTION OF RELATED ART

At present, straws on the market include paper straws, plastic straws, bamboo straws, and the like. Paper straws have the advantages of being low in price, simple in manufacturing process, recyclable, and environmentally friendly, but also have the disadvantages of being poor in durability because they may be softened after being soaked for a long time or in hot water and then deform and cannot be used anymore, so the paper straws are disposable. Plastic straws have the advantages of being low in cost and good in durability, but they are harmful to human bodies and the ecology and are not in conformity with the idea of sustainable development. Bamboo straws made of natural bamboo have the advantages of being good in durability, healthy and environmentally friendly, thus having good development prospects.

Nowadays, bamboo straws are machined by two methods. According to a first solution, a straw hole is drilled in a raw material by means of a drill bit, and then the raw material is cut and polished according to the shape design of products. According to a second solution, a single bamboo splint is wound around a mandrel to form a straw, then redundant portions are removed, and finally, ends of the straw are polished. The first solution has the advantage of high machining efficiency, but bamboo straws machined by this solution are prone to cracking due to drilling. The second solution has the advantage that bamboo straws machined by winding are not prone to cracking, but only one bamboo straw can be machined once, so the efficiency is low, and the product consistency is unsatisfying.

BRIEF SUMMARY OF THE INVENTION

The technical issue to be settled by the invention is to provide a bamboo straw machining method to fulfill high efficiency and good product consistency.

The technical solution adopted by the invention to settle the above technical issues is as follows: a bamboo straw machining method comprises the following steps: connecting two or more bamboo pieces to form a bamboo strip, continuously winding the bamboo strip according to a preset helical angle to form a cylinder, and cutting the cylinder at a preset interval to form straws.

Compared with traditional bamboo straw machining methods, the method provided by the invention has the following beneficial effects: bamboo pieces are continuously connected to obtain a bamboo strip to make a preparation for continuous production, then the continuous bamboo strip is continuously wound to obtain a cylinder which is good in mechanical property, stable in structure, and uniform in appearance, and finally, the cylinder is cut at equal intervals to continuously produce bamboo straws that are highly consistent in specification and performance; and the working efficiency is improved by over 20% on the whole, and labor and equipment costs are greatly reduced.

REFERENCE SIGNS

1, bamboo piece;
2, bamboo strip;
3, cylinder;
4, bamboo roll;
5, mandrel;
6, rubber belt;
7, cutting device;
8, composite material layer.

DETAILED DESCRIPTION OF THE INVENTION

The technical contents, purposes and effects of the invention will be described in detail below in conjunction with embodiments and accompanying drawings.

Figure 1:
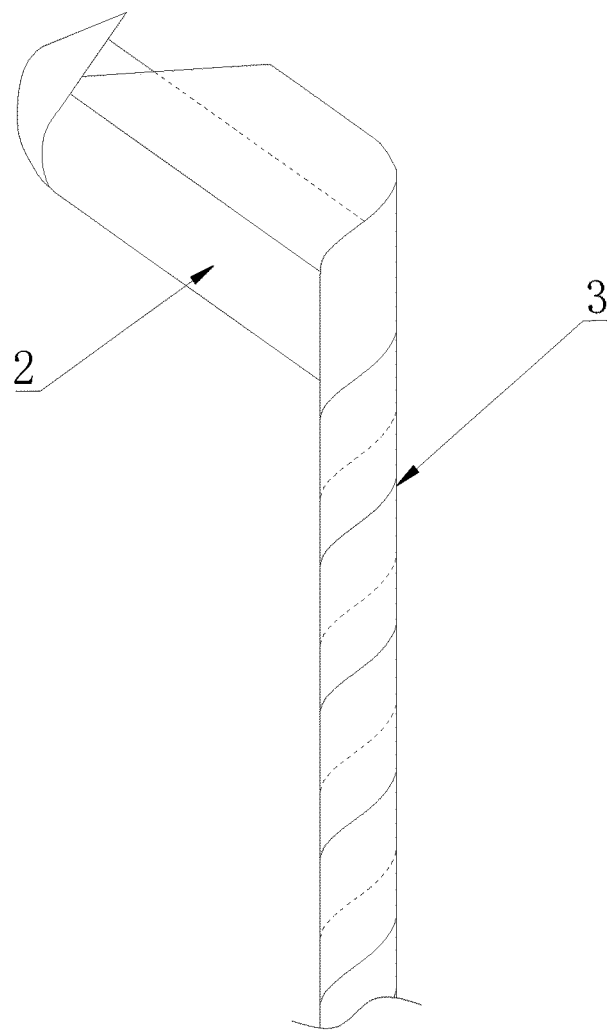
FIG. 1 is a structural diagram of a bamboo straw machining method according to Embodiment 1 of the invention.
Figure 2:
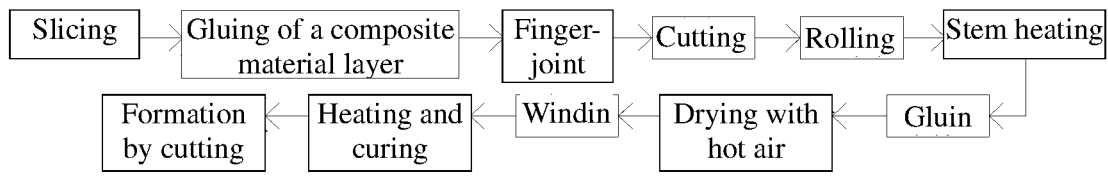
FIG. 2 is a process flow diagram of a bamboo straw machining method according to Embodiment 2 of the invention.
Figure 3:
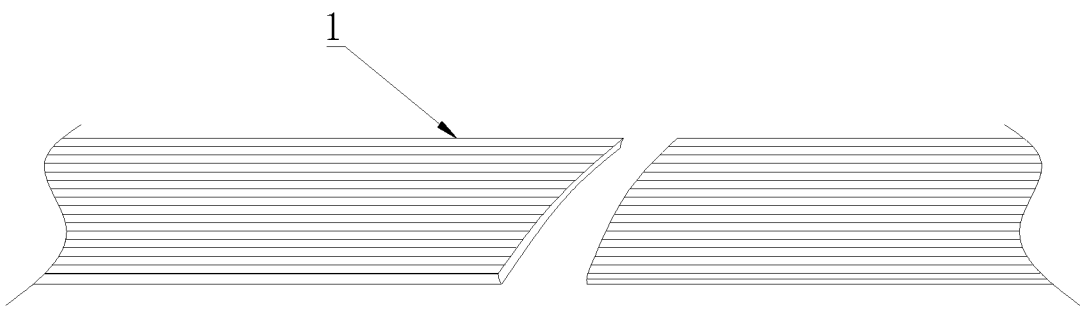
FIG. 3 is a structural diagram of a bamboo piece according to Embodiment 2 of the invention.
Figure 4:
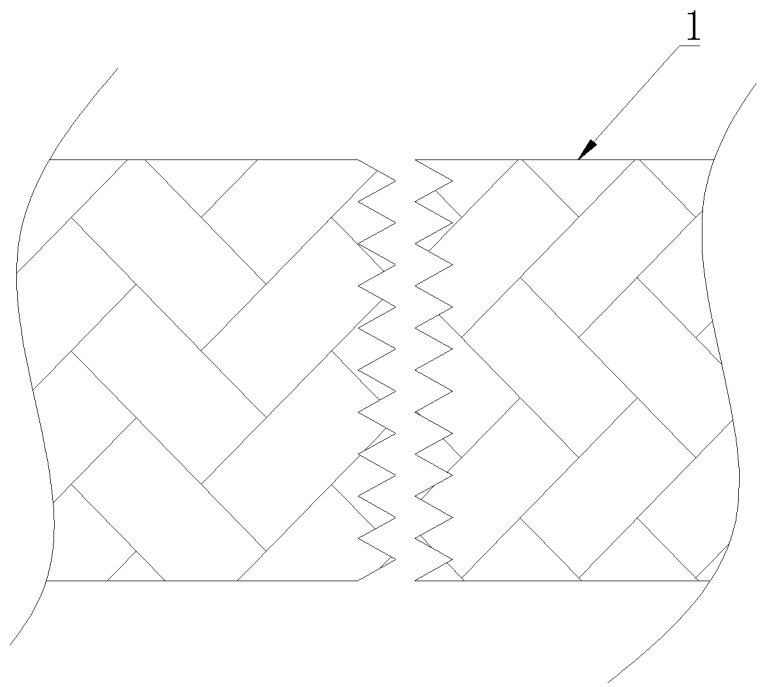
FIG. 4 is another structural diagram of the bamboo piece according to Embodiment 2 of the invention.
Figure 5:
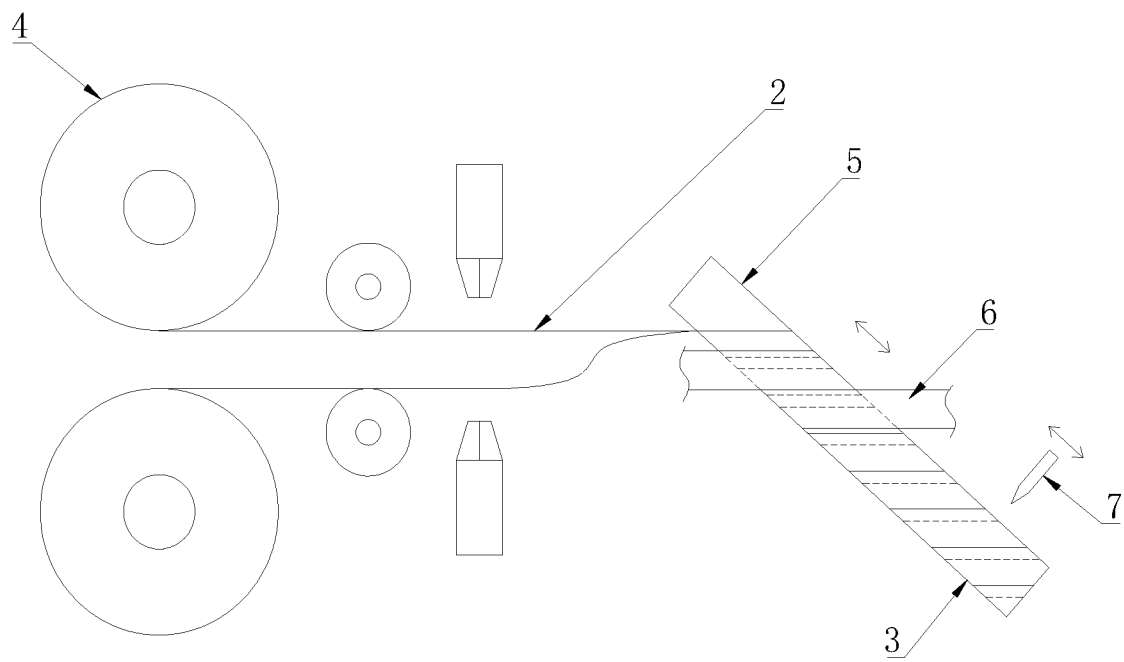
FIG. 5 is a structural diagram of a cylinder according to Embodiment 2 of the invention.
Figure 6:
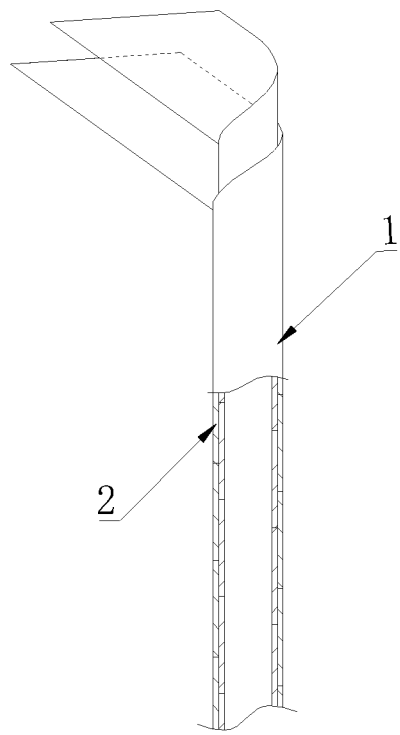
FIG. 6 is a structural diagram of a cylinder according to Embodiment 3 of the invention.
Figure 7:
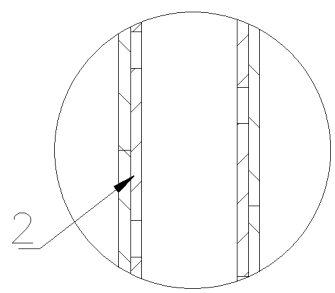
FIG. 7 is a partial enlarged view of the cylinder according to Embodiment 3 of the invention.
Figure 8:
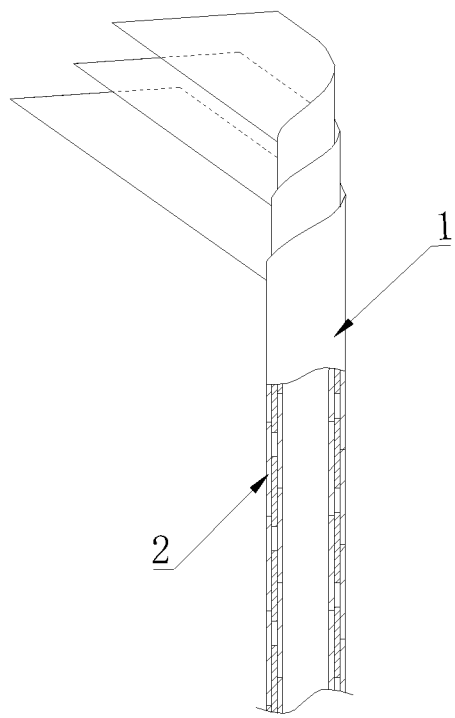
FIG. 8 is a structural diagram of a cylinder according to Embodiment 4 of the invention.
Figure 9:
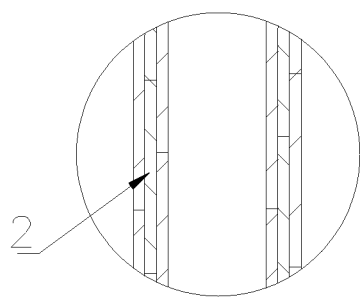
FIG. 9 is a partial enlarged view of the cylinder according to Embodiment 4 of the invention.
Figure 10:
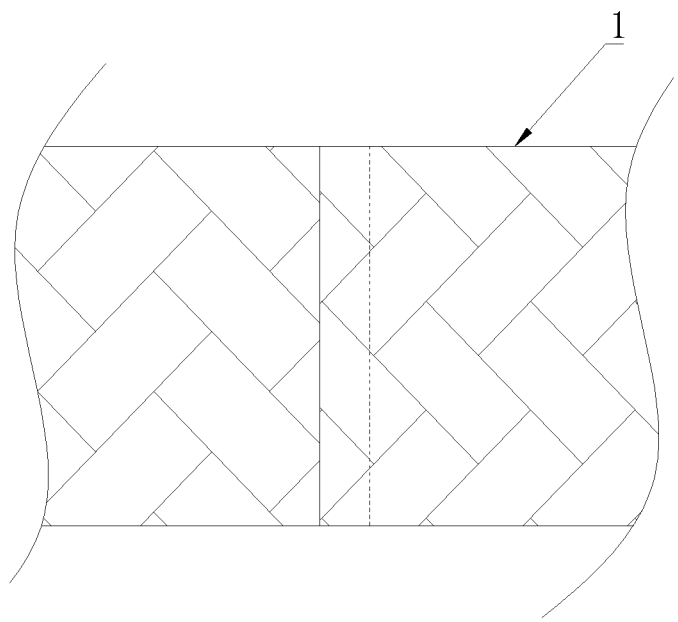
FIG. 10 is a structural diagram of a bamboo piece according to Embodiment 5 of the invention.
Figure 11:
FIG. 11 is a structural diagram of a bamboo piece according to Embodiment 11 of the invention.

Referring to FIG. 1 to FIG. 11, a bamboo straw machining method comprises the following steps: connecting two or more bamboo pieces to form a bamboo strip, continuously winding the bamboo strip according to a preset helical angle to form a cylinder, and cutting the cylinder at a preset interval to form straws.

From the above description, compared with traditional bamboo straw machining methods, the method provided by the invention has the following beneficial effects: bamboo pieces are continuously connected to obtain a bamboo strip to make a preparation for continuous production, then the continuous bamboo strip is continuously wound to obtain a cylinder which is good in mechanical property, stable in structure and uniform in appearance, and finally, the cylinder is cut at equal intervals to continuously produce bamboo straws that are highly consistent in specification and performance; and the working efficiency is improved by over 20% on the whole, and labor and equipment costs are greatly reduced.

Further, the bamboo straw machining method specifically comprises:

Machining a bamboo material to obtain the two or more bamboo pieces with a uniform thickness, and connecting the two or more bamboo pieces in a bamboo fiber direction to obtain the bamboo strip.

From the above description, the bamboo material is machined into the bamboo pieces with the same thickness, so that the uniformity of straws obtained after winding is guaranteed; and the bamboo pieces are connected in the fiber direction (axial direction), so that the stability of a connecting structure of two bamboo pieces is improved, and the risk of cracking and breakage of the bamboo strip is lowered.

Further, the bamboo straw machining method specifically comprises:

Cutting the bamboo strip in the bamboo fiber direction according to a preset strip width, and winding the cut bamboo strip to form bamboo rolls.

From the above description, the bamboo strip is cut in the fiber direction according to the preset strip width, so that the cutting difficulty is lowered, the cutting quality is improved, burrs that may affect subsequent winding and gluing effects will not be formed on a cut surface, and the attractiveness of finally obtained straws is improved. The cut bamboo strip is wound to form the bamboo rolls that are easy to store and transport, and the unrolling and winding efficiency and quality of the bamboo rolls in the subsequent stage are improved.

Further, the bamboo straw machining method specifically comprises:

Synchronously unrolling two or more bamboo rolls, and winding the two or more unrolled bamboo strips in a stacked manner.

From the above description, when bamboo straws are designed to be of a multi-layer structure, different bamboo strips are rolled separately before winding, and then the bamboo rolls are synchronously unrolled, and finally, the unrolled bamboo strips are wound in the stacked manner.

Further, the width of the bamboo strip on the outer layer is designed to be greater than that of the bamboo strip on the inner layer, and the unrolling speed of the bamboo strip on the outer layer is controlled to be less than that of the bamboo strip on the inner layer.

From the above description, the sealing performance and structural strength of bamboo straws are improved.

Further, the bamboo straw machining method specifically comprises:

Gluing a composite material layer on a to-be-glued surface of each bamboo piece, smearing glue on surfaces of the composite material layers before the bamboo strip is wound, and heating the bamboo strip before winding.

From the above description, the to-be-glued surface of each bamboo strip is determined according to the stacking manner, the composite material layer is glued on the to-be-glued surface of each bamboo piece, and then the bamboo strip is cut. When glue is smeared on one or two sides of the surface of the bamboo strip, the glue is evenly smeared on the composite material layer, the quantity of the glue can be automatically controlled according to the properties of the glue, and the composite material layer is mainly used for improving the gluing firmness and improving the mechanical properties of machined bamboo straws. The bamboo strip is heated to remove redundant moisture in bamboo skin and keep the temperature of a bamboo skin body within a reasonable range to fulfill a softening purpose, thus improving the gluing effect and the winding effect in the subsequent stage.

Further, the bamboo straw machining method specifically comprises:

Performing steam heating before glue is smeared on a surface of the bamboo strip.

From the above description, the steam heating is performed to control the moisture content of the bamboo strip, so that the bamboo strip has better tenacity and is not prone to cracking, and glue can be smeared easily.

Further, the bamboo straw machining method specifically comprises:

Determining the preset helical angle according to a strip width of the bamboo strip and a winding diameter of the bamboo strip, and continuously winding the bamboo strip in a helical direction the same as the bamboo fiber direction according to the preset helical angle to form the cylinder.

From the above description, the preset helical angle depends on the strip width of the bamboo strip and the diameter of a mandrel for winding the bamboo strip, and the bamboo strip is helically wound in the fiber direction (stem direction) according to the preset helical angle, so that the winding difficulty is lowered, the mechanical properties of the cylinder formed by winding are guaranteed, cracking is prevented, and cutting is facilitated.

Further, the bamboo straw machining method specifically comprises:

During winding, winding two or more bamboo strips on a same mandrel in a staggered and stacked manner according to the preset helical angle.

From the above description, two or more bamboo strips are wound in a stepped manner, so that the strength and appearance uniformity of bamboo straws are improved. Preferably, when the bamboo strip on the inner layer is wound, edges of the bamboo strip are closely connected; when the bamboo strip on the outer layer is wound, edges of the bamboo strips are also closely connected; and the bamboo strip on the outer layer covers a joint of the bamboo strip on the inner layer when wound, so that the strength and sealing performance of straws are improved.

Further, the bamboo straw machining method specifically comprises:

Pressing the bamboo strips on the mandrel, and tensioning and helically conveying the cylinder by means of a frictional force opposite to a bamboo winding direction.

From the above description, the cylinder is pressed and conveyed forwards through the cooperation of the pressure and the frictional force, so that tensioning and conveying are realized synchronously.

Further, the bamboo straw machining method specifically comprises:

Cutting the cylinder by a cutting device which moves at a speed the same as a conveying speed of the cylinder.

From the above description, when conveyed, the cylinder is cut by the cutting device which moves at a speed the same as the conveying speed of the cylinder, so that kerfs are flat, the workload of polishing and shaping end faces of bamboo straws in the later stage is reduced, and the machining efficiency is improved.

Referring to FIG. 1 to FIG. 11, Embodiment 1 of the invention is as follows:

A bamboo straw machining method comprises the following steps: two or more bamboo pieces 1 are connected to form a bamboo strip 2, the bamboo strip 2 is continuously wound according to a preset helical angle to form a cylinder 3, and the cylinder 3 is cut according to a preset interval to form straws.

Referring to FIG. 1 to FIG. 11, Embodiment 2 of the invention is as follows:

First, a bamboo material is sliced according to a preset thickness to form two or more bamboo pieces 1 with a thickness of 0.1 mm, and a composite material layer 8 is glued on a to-be-glued surface of each bamboo piece 1; and the two or more bamboo pieces 1 are finger-jointed in a bamboo fiber direction to obtain a bamboo strip 2. The bamboo strip 2 is cut in the bamboo fiber direction according to a preset strip width. Two bamboo strips 2 are rolled separately to obtain two bamboo rolls 4; and after being unrolled, the two bamboo strips 2 are heated with steam in a semi-closed steam box, wherein the temperature in the steam box is 45° C. and is controlled according to the speed of the bamboo strips 2 passing through the steam box and the moisture content of the bamboo strips 2, and by treating the bamboo strips 2 with steam, the moisture content of the bamboo strips 2 is made less than 12%, and thus, the bamboo strips 2 are better in tenacity and are not prone to cracking. Glue is smeared on one side of the composite material layer 8 on the surface of each of the two unrolled bamboo strips 2, and then the bamboo strips 2 are heated with hot air to be dried. Specifically, the bamboo strips 2 pass through a narrow hot air passage at a linear speed of 10 m/min, wherein the temperature in the narrow hot air passage is less than 400° C. and is controlled according to the linear speed of the bamboo strips 2, so that redundant moisture in the bamboo strips 2 is removed, and the temperature of bamboo strip 2 bodies is kept within 100° C., so that a softening purpose is realized. The two unrolled bamboo strips 2 are synchronously and closely wound on a same mandrel in a stepped manner, that is, when the bamboo strip 2 on the inner layer is wound, edges of the bamboo strip are closely connected; when the bamboo strip 2 on the outer layer is wound, edges of the bamboo strips are also closely connected; the bamboo strip 2 on the outer layer covers a joint of the bamboo strip 2 on the inner layer when wound, so that the strength, sealing performance and appearance uniformity of straws are improved; and glue-coated surfaces of the two bamboo strips 2 are opposite to each other, and side walls, close to and away from the mandrel, of each bamboo strip 2 are large-density side walls of the bamboo strip 2.

Then, a preset helical angle is determined according to a strip width of the bamboo strips 2 and a diameter of a mandrel 5 for winding the bamboo strips 2, the bamboo strips 2 are continuously wound in a helical direction the same as the bamboo fiber direction according to the preset helical angle to form a cylinder 3, and during winding, the bamboo strips 2 are wound and pressed by means of a rubber belt 6 which moves helically with respect to the mandrel 5, and are conveyed forwards at a constant speed at the same time.

Finally, the cylinder 3 is heated and cured in sequence and then continuously cut to obtain two or more straws with the same length, wherein the cylinder 3 is heated and cured with 65° C. hot air that is sprayed out via a nozzle along the mandrel 5, the temperature is set according to the curing property of glue, and to cure the glue, the temperature is automatically controlled according to the curing property of the glue. Continuous cutting means that the cylinder 3 is cut at a constant speed and at equal intervals, so that straws with the same length and flush cut surface are obtained; a cutting device 7 which moves at a speed the same as the conveying speed of the cylinder 3 is used to cut the cylinder 3, the cylinder 3 is cut by means of a tool rotating at a speed of 500 r/min, or by means of 65W laser. The laser cutting has the advantages of high speed and no burr at kerfs.

Referring to FIG. 1 to FIG. 11, Embodiment 3 of the invention differs from Embodiment 2 in the following aspects: the two unrolled bamboo strips 2 are synchronously wound on the same mandrel in a stepped manner, that is, when the bamboo strip 2 on the inner layer is wound, a gap is reserved between edges of the bamboo strip 2; when the bamboo strip 2 on the outer layer is wound, edges of the bamboo strip 2 are closely connected; and the bamboo strip 2 on the outer layer covers the gap of the bamboo strip 2 on the inner layer when wound.

Referring to FIG. 1 to FIG. 11, Embodiment 4 of the invention differs from Embodiment 2 in the following aspects:

In this embodiment, three bamboo strips 2 are rolled separately to obtain three bamboo rolls 4, the three bamboo strips 2 unrolled from the three bamboo rolls 4 are synchronously and closely wound on the same mandrel in a stepped manner, glue is smeared on one side of each of the bamboo strips 2 on the inner layer and the outer layer like Embodiment 2, and glue is smeared on both sides of the bamboo strip 2 in the middle.

Referring to FIG. 1 to FIG. 11, Embodiment 5 of the invention differs from Embodiment 2 in that two or more bamboo pieces 1 are bonded in a bamboo fiber direction to obtain a bamboo strip 2.

Referring to FIG. 1 to FIG. 11, Embodiment 6 of the invention differs from Embodiment 2 in that two or more bamboo pieces 1 are buckled in a bamboo fiber direction to obtain a bamboo strip 2.

Referring to FIG. 1 to FIG. 11, Embodiment 7 of the invention differs from Embodiment 2 in that microwave heating is used for drying.

Referring to FIG. 1 to FIG. 11, Embodiment 8 of the invention differs from Embodiment 2 in that a heating tube is used for heating and drying.

Referring to FIG. 1 to FIG. 11, Embodiment 9 of the invention differs from Embodiment 2 in that, in this embodiment, the thickness of the bamboo pieces 1 is 0.5 mm; the temperature in the steam box is 90° C.; the bamboo strips 2 pass through the narrow hot air passage at a linear speed of 60 m/min, and the temperature of the bamboo strip 2 bodies is kept at 130° C.; the temperature of the hot air used for heating and curing is 120° C.; and the speed of the tool is 3000 r/min.

Referring to FIG. 1 to FIG. 11, Embodiment 10 of the invention differs from Embodiment 2 in that, in this embodiment, the thickness of the bamboo pieces 1 is 0.25 mm; the temperature in the steam box is 67° C.; the bamboo strips 2 pass through the narrow hot air passage at a linear speed of 35 m/min, and the temperature of the bamboo strip 2 bodies is kept at 115° C.; the temperature of the hot air used for heating and curing is 93° C.; and the speed of the tool is 1750 r/min.

Referring to FIG. 1 to FIG. 11, Embodiment 11 of the invention differs from Embodiment 2 in the following aspects:

The composite material layer 8 is a non-woven fabric layer of a specification of 10 g/mm$^2$ and a thickness of 0.02 mm, and the non-woven fabric layer is bonded to the surface, coated with glue, of the bamboo piece. The non-woven fabric layer has the following advantages: (1) the meshed fiber structure can improve the gluing effect and the gluing firmness of bamboo strips, thus facilitating helical winding of the bamboo strips; (2) the mechanical property of machined bamboo straws is improved, the strength, tenacity and bending resistance of the straws are enhanced, and the bamboo straws are prevented from breaking or cracking; and (3) the non-woven fabric layer is light and thin, thus having not influence on the quality and thickness of the bamboo straws.

To sum up, compared with traditional bamboo straw machining methods, the method provided by the invention has the following advantages: bamboo pieces are continuously connected to obtain a bamboo strip to make a preparation for continuous production, then the continuous bamboo strip is continuously wound to obtain a cylinder which is good in mechanical property, stable in structure and uniform in appearance, and finally, the cylinder is cut at equal intervals to continuously produce bamboo straws that are highly consistent in specification and performance; and the working efficiency is improved by over 20% on the whole, and labor and equipment costs are greatly reduced.

The above description is merely used to explain the embodiments of the invention, and is not intended to limit the scope of the patent of invention. All equivalent transformations made according to the contents in the specification and the accompanying drawings, or direct or indirect applications to related technical fields should also fall within the protection scope of the patent of invention.

What is claimed is:

1. A bamboo straw machining method, comprising:
   connecting two or more bamboo pieces to form two or more bamboo strips, continuously winding the two or more bamboo strips according to a preset helical angle to form a cylinder, and cutting the cylinder according to a preset interval to form straws;
   during winding, winding the two or more bamboo strips on a same mandrel in a staggered and stacked manner according to the preset helical angle;
   pressing the two or more bamboo strips on the mandrel, and tensioning and helically conveying the cylinder by means of a frictional force opposite to a winding direction of the two or more bamboo strips.

2. The bamboo straw machining method according to claim 1, comprising: machining a bamboo material to obtain the two or more bamboo pieces with a uniform thickness, and connecting the two or more bamboo pieces in a bamboo fiber direction to obtain the two or more bamboo strips.

3. The bamboo straw machining method according to claim 2, comprising: cutting the two or more bamboo strips into cutting strips in the bamboo fiber direction according to a preset strip width, and winding the cutting strips to form bamboo rolls.

4. The bamboo straw machining method according to claim 2, comprising: synchronously unrolling the two or more bamboo strips, and winding the two or more unrolled bamboo strips in the staggered and stacked manner.

5. The bamboo straw machining method according to claim 2, comprising: gluing a composite material layer on a to-be-glued surface of each bamboo piece of the two or more bamboo pieces, smearing glue on the composite material layers before the two or more bamboo strips are wound, and heating the two or more bamboo strips before winding.

6. The bamboo straw machining method according to claim 5, comprising: performing steam heating before glue is smeared on a surface of each bamboo strip of the two or more bamboo strips.

7. The bamboo straw machining method according to claim 1, comprising: determining the preset helical angle according to a strip width of the two or more bamboo strips and a winding diameter of the two or more bamboo strips, and continuously winding the two or more bamboo strips in a helical direction same as a bamboo fiber direction according to the preset helical angle to form the cylinder.

8. The bamboo straw machining method according to claim 1, comprising: cutting the cylinder by a cutting device that moves at a speed same as a conveying speed of the cylinder.

* * * * *